United States Patent Office 3,250,548
Patented May 10, 1966

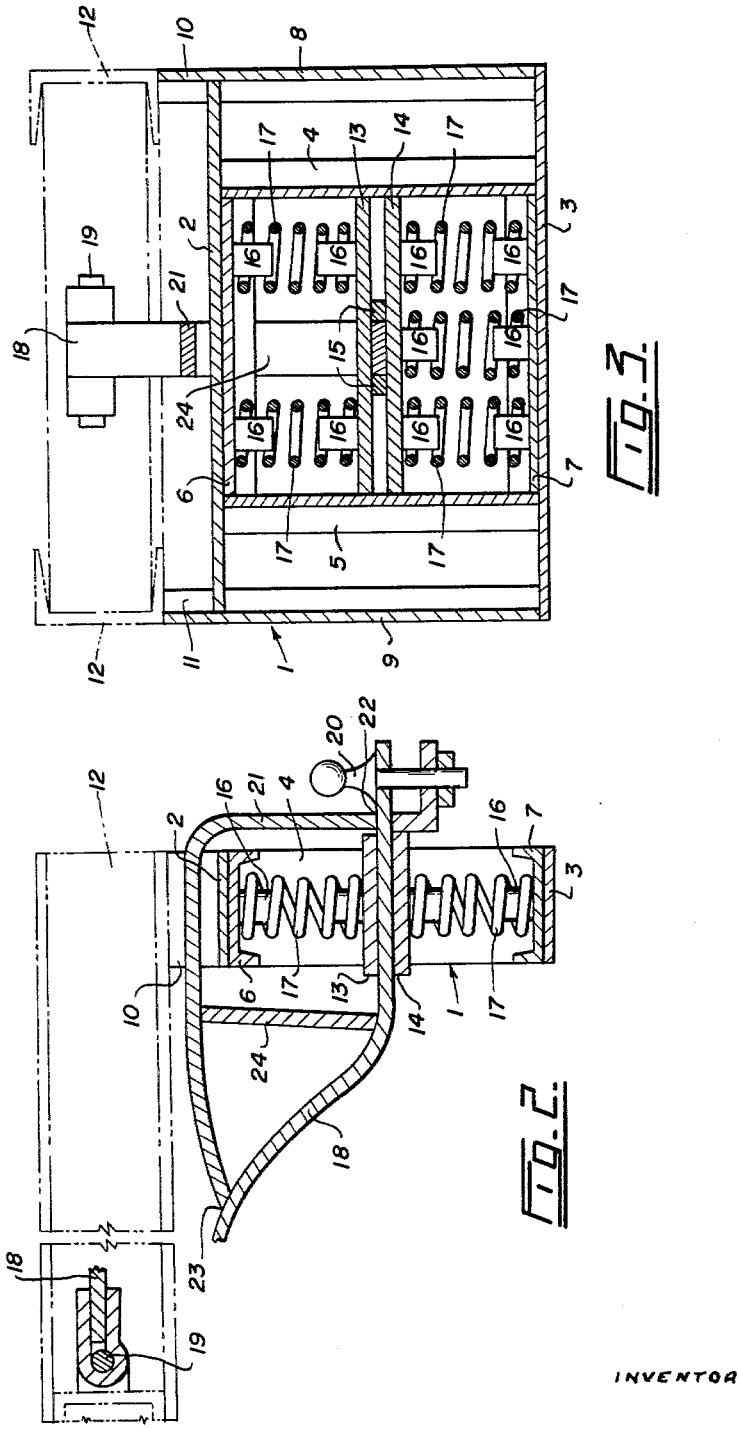

3,250,548
TRAILER HITCH
Barkley Boyd, 12025 69th St., Edmonton,
Alberta, Canada
Filed Dec. 5, 1963, Ser. No. 328,415
4 Claims. (Cl. 280—489)

This invention relates generally to trailer hitches and in particular to an improved hitch designed to absorb and lessen the shock of vertical movement of a trailer on the towing vehicle.

I am aware that a number of shock absorbing trailer hitches have been developed in the past and that these hitches may be interposed between a towing vehicle and trailer. These hitches suffer from the disadvantage that the direct draft connection between the towing vehicle and the trailer usually is interconnected with the shock absorbing mechanism and the result is that the shock absorbing mechanism operates inefficiently or incorrectly.

To overcome the above and other difficulties found in shock abosrbing trailer hitches, I have developed a hitch for use in towing large and cumbersome vehicles, as for example, large unwieldly house trailers, and the like. My improved hitch includes shock absorbing means that will damp out vertical movement at the trailer hitch and reduce the shock of such vertical movement to the towing vehicle and, at the same time, provide a draft connection between the towing vehicle and the trailer that passes through the shock absorbing means but is not connected directly thereto and that does not in any way hinder operation of the shock absorbing means.

Further, I have provided means to reinforce the draft connection between the trailer and the towing vehicle by a jumper bar which extends around the shock absorbing means to strengthen the draft connection and allow the apparatus to be used to draw heavy trailers and the like without increasing the size of the draw bar to unwieldy proportions.

Broadly speaking my improved trailer hitch comprises a framework attachable to a towing vehicle, a shock absorbing mechanism and a pair of pressure plates with a draw bar secured at one end to the towing vehicle and extending between the pressure plates to terminate in a draft connection, and a jumper bar extending around the framework to reinforce the draw bar.

FIGURE 2 is a sectional side elevation of my improved trailer hitch illustrating the attachment of the hitch to a vehicle framework.

FIGURE 3 is a sectional end view of the embodiment illustrated in FIG. 2.

Figure 1:
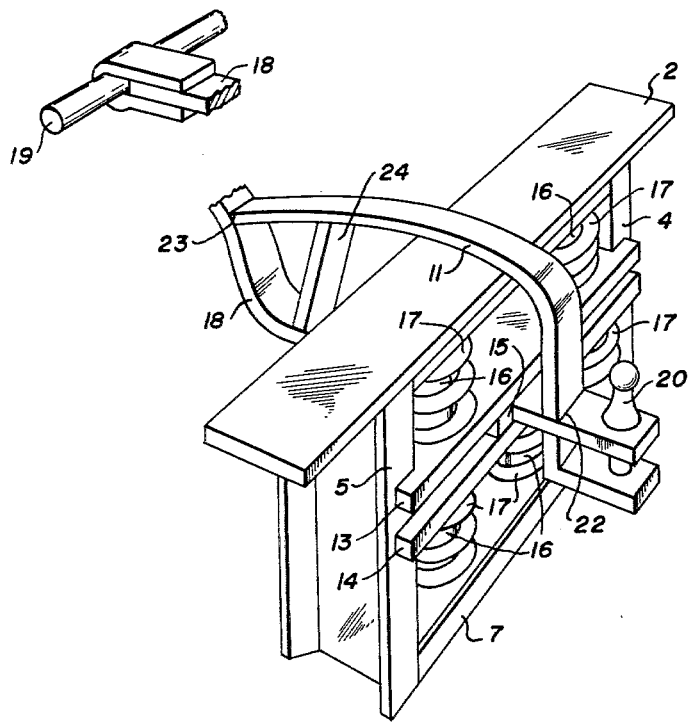
FIGURE 1 is a projected view of the complete trailer hitch.

With refernce now to the drawings, my device comprises the framework indicated generally at 1 and composed of upper and lower horizontal members 2 and 3 and spaced vertical side members 4 and 5. It will be noted that the vertical side members 4 and 5 are spaced apart and the upper and lower horizontal members 2 and 3 are reinforced by the additional horizontal spacers 6 and 7 and are connected to additional vertical members 8 and 9. The additional vertical members 8 and 9 project upwardly beyond the upper horizontal member 2 as indicated at 10 and 11 and connection to the framework 1 to a vehicle chassis 12 is accomplished by connecting the ends 10 and 11 as by welding or other means to the chassis.

A pair of horizontal pressure plates 13 and 14 are mounted slidably in the framework 1 between the vertical members 4 and 5 and the pressure plates are held in spaced apart relationship by the spaced blocks 15—15 which are secured to one of the plates. Studs 16 project from the horizontal pressures plates 14 and 13 toward the end members 2 and 3 and additional studs 16 project from the end members 6 and 7 toward the studs on the pressure plates and in line therewith. Compression springs 17 extend between the pressure plates 13 and 14 and the upper and lower horizontal members 6 and 7 and the springs 17 are contained on the studs 16 to prevent lateral displacement of the springs.

With this construction it will be obvious that the horizontal pressure plates 13 and 14 may move upwardly or downwardly in relation to the framework 1 but any upward or downward movement of the pressure plates 13 and 14 will be controlled by the compression springs 17.

The main draw bar 18 is connected hingedly at its one end to the pin 19 secured to the vehicle chassis 12 and extends at its opposite end between the pressure plates 13 and 14 and the blocks 15 to terminate at a trailer hitch 20 which, in this case, is a ball joint of standard design.

The draw bar 18 is strengthened by the jumper bar 21 which is secured at its one end 22 to the draw bar 18 adjacent the ball 20 and is formed over the upper horizontal member 2 and is connected at its opposite end 23 to the draw bar 18 on the opposite side of the framework 1. A brace 24 is provided between the jumper bar 21 and the draw bar 18 as indicated.

In operation, the device is assembled substantially as illustrated and described and the framework 1 is connected to the chassis of a vehicle adjacent the rear thereof and with the ball 20 projecting at the rear of the vehicle for interconnection with a trailer coupling. As described, the direct draft connection between the trailer and the towing vehicle will be through the draw bar 18 and the jumper bar 21 and there will be no force exerted on the pressure plates 15 or the compression spring 17.

The pressure plates 13 and 14 and the tension spring 17 will be then free to damp out or absorb any upward or downward movement of the draw bar 18 to lessen the shock of such movement on both the towing vehicle and on the towed trailer.

What I claim as my invention is:

1. In a trailer hitch, a framework adapted for attachment to a vehicle, such framework including spaced horizontal upper and lower members interconnected by spaced vertical side members, a pair of spaced horizontal pressure plates fitted slidably in the framework, upper compression springs extending between one of the plates and the upper horizontal member and lower compression springs extending between the other plate and the lower horizontal member, a draw bar connected hingedly about a horizontal axis at one end to the said vehicle and extending at its opposite end between the plates to terminate at its opposite end behind the vehicle in a trailer hitch, a jumper bar connected at one end to the draw bar on one side of the framework and extending over the upper horizontal member and connected at its opposite end to the draw bar adjacent the hinged connection of the draw bar to the lead vehicle.

2. The trailer hitch as claimed in claim 1 wherein the pressure plates are spaced apart by blocks secured to one of the plates.

3. The trailer hitch as claimed in claim 1 wherein the horizontal pressure plates have a slidable connection at their ends with the vertical side members.

4. The hitch as claimed in claim 1 and studs projecting from the upper and lower horizontal members towards the pressure plates and from the pressure plates towards the upper and lower members and wherein the upper and lower compression springs are engaged at their ends on the studs.

References Cited by the Examiner
UNITED STATES PATENTS

| | | | |
|---|---|---|---|
| 2,523,733 | 9/1950 | Stephens | 280—489 |
| 2,531,289 | 11/1950 | Murat | 280—489 X |
| 2,852,274 | 9/1958 | Seiley | 280—489 |
| 3,118,688 | 1/1964 | Stilley | 280—483 X |

LEO FRIAGLIA, *Primary Examiner.*

A. HARRY LEVY, *Examiner.*

R. C. PODWIL, *Assistant Examiner.*